United States Patent [19]

Queyroix

[11] Patent Number: 4,595,501

[45] Date of Patent: Jun. 17, 1986

[54] HORIZONTAL ENDLESS BELT VACUUM FILTERS

[76] Inventor: Christian Queyroix, 29, avenue de Condé, 78600 Maisons Laffitte, France

[21] Appl. No.: 600,331

[22] Filed: Apr. 13, 1984

[30] Foreign Application Priority Data

Apr. 14, 1983 [FR] France .................. 83 06097

[51] Int. Cl.$^4$ .............. B01D 33/04; B01D 33/40
[52] U.S. Cl. ................... 210/400; 210/406; 210/416.1; 162/278; 162/297; 162/365; 162/367
[58] Field of Search ............. 210/783, 400, 401, 406, 210/416.1, DIG. 3, DIG. 4, DIG. 12, 409; 162/275, 277, 278, 279, 297, 335, 341, 347, 348, 351, 353, 354, 365, 367; 209/307

[56] References Cited

U.S. PATENT DOCUMENTS

| | | | |
|---|---|---|---|
| 2,997,179 | 8/1961 | Gooijer | 210/406 |
| 3,190,451 | 2/1965 | Holland | 210/401 |
| 3,939,076 | 2/1976 | Seibert | 210/406 |
| 3,941,701 | 3/1976 | Stahl et al. | 210/401 |
| 4,038,193 | 7/1977 | Oosten | 210/400 |
| 4,127,487 | 11/1978 | Havalda | 210/401 |
| 4,186,090 | 1/1980 | van Oosten | 210/400 |
| 4,212,745 | 7/1980 | Jellesma | 210/401 |
| 4,265,765 | 5/1981 | Gallottini | 210/401 |
| 4,285,815 | 8/1981 | Gallottini | 210/400 |
| 4,336,139 | 6/1982 | Mueller | 210/401 |
| 4,390,433 | 6/1983 | Duncan | 210/400 |
| 4,419,249 | 12/1983 | Bolton et al. | 210/401 |
| 4,483,770 | 11/1984 | Casey et al. | 210/401 |

FOREIGN PATENT DOCUMENTS 47144 1/1937 France .
1421665 11/1965 France .

Primary Examiner—Richard V. Fisher
Assistant Examiner—Wanda L. Millard
Attorney, Agent, or Firm—Sandler & Greenblum

[57] ABSTRACT

A horizontal endless belt vacuum filter comprises an endless belt pierced, in its central part, with holes moving above the upper opening of a longitudinal vacuum and extending beneath the upper side of the conveyor belt. An endless filtering medium passes over guide rollers and is applied on the upper side of the conveyor belt, in order to receive the mass to be filtered. The vacuum box is mounted to pivot, as a whole, about a longitudinal axis offset laterally on one side of the conveyor belt. This vacuum box is borne by the inner ends of transverse bars which are articulated on horizontally aligned bearings materializing the pivot axis and which bear, at their outer ends, a manifold. This manifold is connected on the one hand to the vacuum box, via at least one connecting pipe, and on the other hand to the source of vacuum, by at least one dismountable coupling member.

25 Claims, 4 Drawing Figures

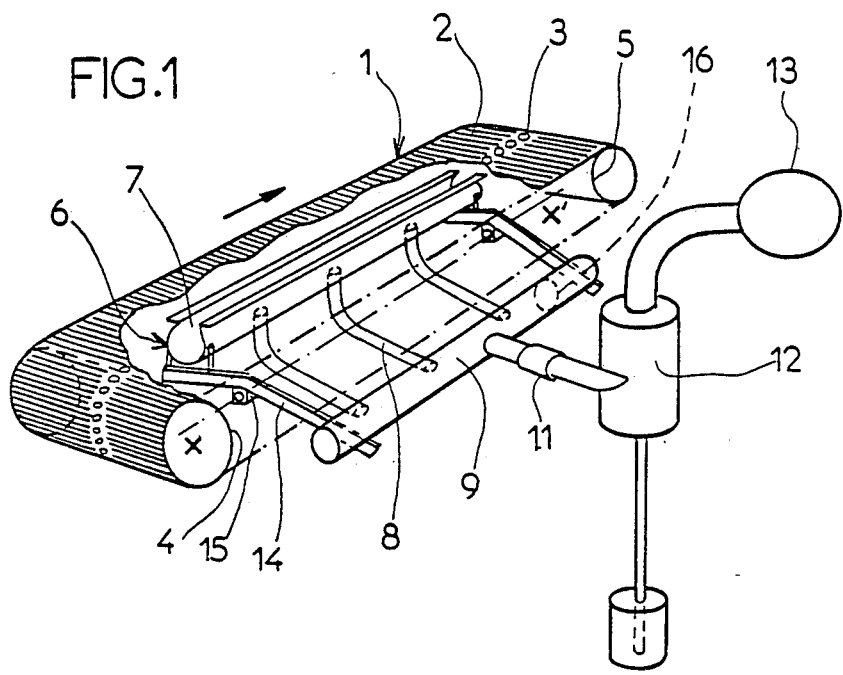
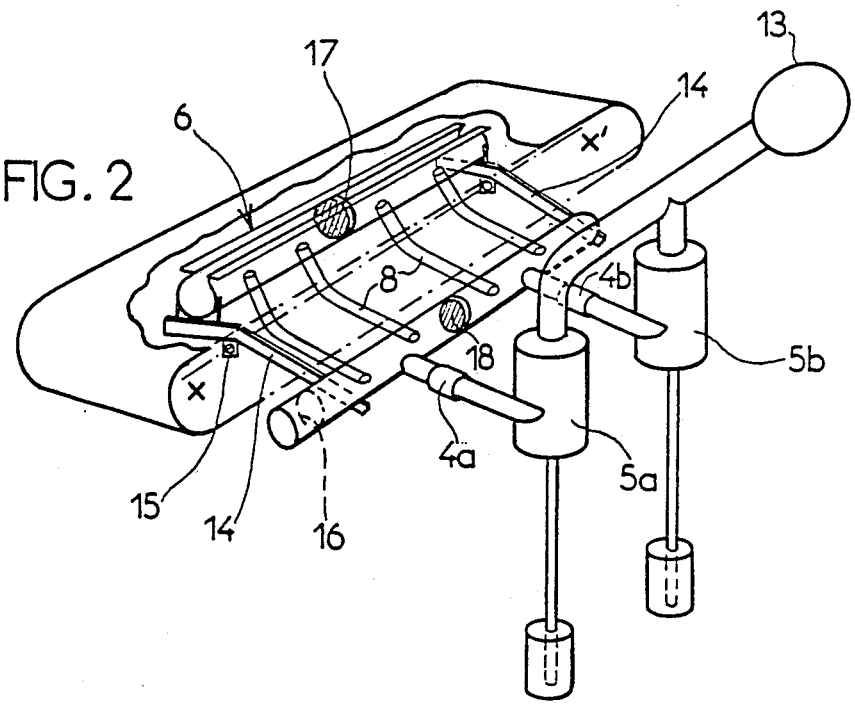

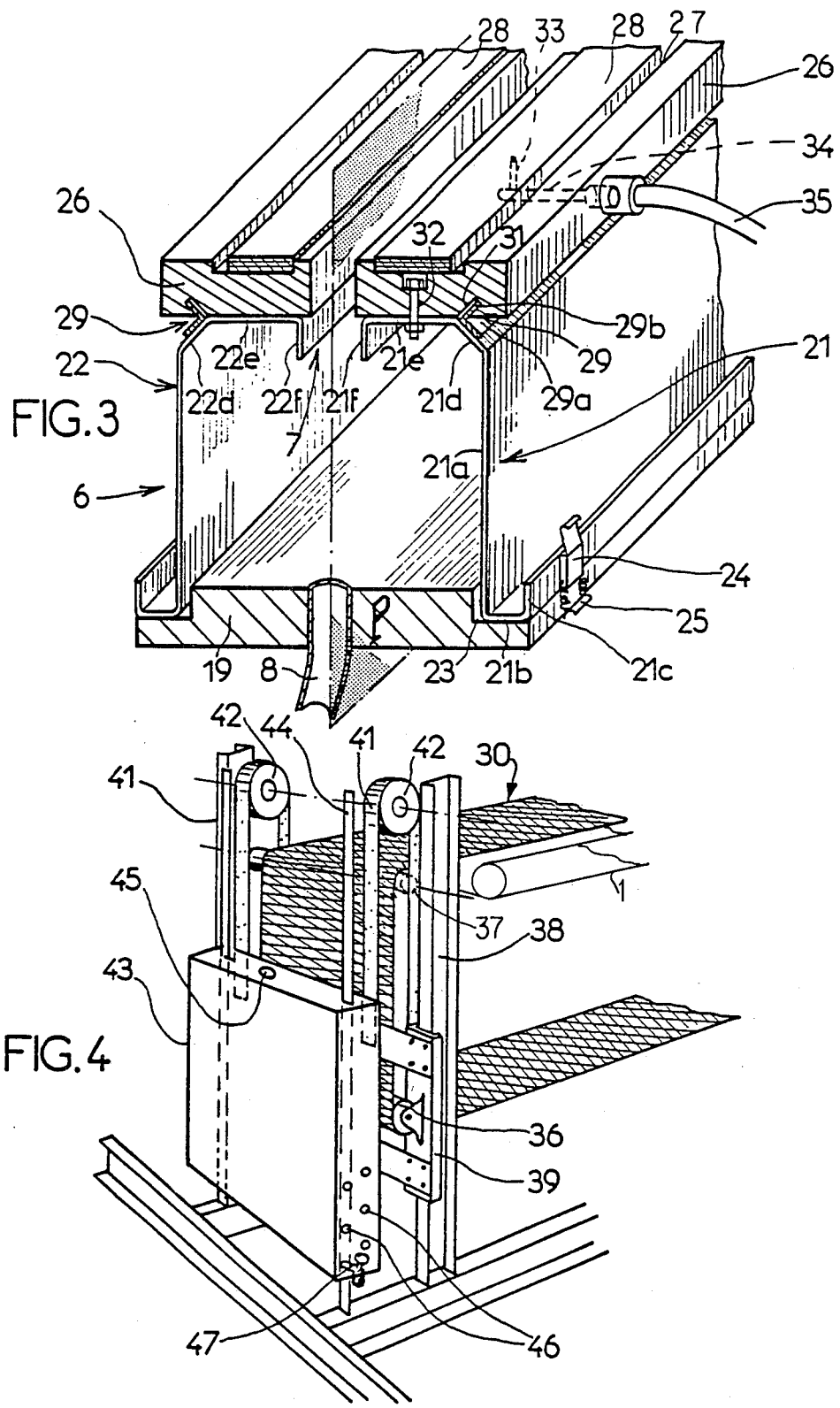

HORIZONTAL ENDLESS BELT VACUUM FILTERS

BACKGROUND OF THE INVENTION

The present invention relates to improvements in or relating to horizontal endless belt vacuum filters.

Filters of this type are already known, which essentially comprise an endless conveyor belt made of rubber, extending horizontally between two drums and whose cross section is in the form of a trough when longitudinal and lateral beads are present. The bottom of this belt presents outwardly open, transverse grooves allowing the liquid resulting from filtration to flow towards orifices pierced in the central part of the belt. On this conveyor belt is disposed a filtering medium constituted, for example, by a cloth on which the matter to be filtered is disposed. Beneath the upper side of the conveyor belt is located a vacuum box extending longitudinally and whose upper part, which is open, lies below the central orifices of the conveyor belt. This vacuum box which is connected to a source of vacuum, collects, by suction, the filtrate coming from the mass to be filtered.

In such belt filters, the vacuum box which constitutes an important part of the filter, is subjected to frequent operations of maintenance and/or cleaning and to this end various devices for manoeuvring the vacuum box have already been provided for facilitating these operations. The known devices for manoeuvring the vacuum box comprise various mechanisms such as counterweights, cable or chain winches, pneumatic, electrical or hydraulic jacks, racks, screws, jacks, articulated parallelograms, etc. Now, these devices are not very practical to use and they present numerous drawbacks. In fact, the counterweights are cumbersome especially when water is used as weighty element. The winches must be maintained clean and when the vacuum box is long, it is necessary to manoeuvre several winches in synchronism, otherwise the vacuum box would be twisted. As for the jacks, they require a particular energy source, good protection and continuous maintenance. Regarding the other mechanical devices mentioned, they are expensive and require good maintenance. In addition, none of the known devices for manoeuvring the vacuum box makes it possible to distribute the suction over the whole length of the vacuum box.

Furthermore, another drawback presented by most of the heretofore known endless belt filters is that their vacuum box is made in one piece, in sheet metal, so as to present substantially U-shaped cross section, with narrowed upper opening which is bordered by two lateral coplanar flanges extending outwardly. A vacuum box made in this way in one piece is difficult to manufacture with sufficient precision and it is not easy to clean and to position and/or to displace intermediate partitions. Furthermore, the two upper horizontal flanges bordering the vacuum box bear longitudinal strips for slide of the conveyor belt, which strips tend to be permanently drawn towards the upper opening of the vacuum box, due to the depression created in this box.

Belt filters also provided with a mechanism ensuring the correct tensioning of the filtering medium, this mechanism generally employing a weighty roller acting by its weight on one side of the filtering medium. However, the associated devices for lifting the weighty roller in order to slacken the filtering medium are generally relatively complicated and not easy to emply.

SUMMARY OF THE INVENTION

It is an object of the present invention to overcome these various drawbacks by producing an endless belt filter provided with particularly simple means for manoeuvring and cleaning the vacuum box, for correct distribution of the suction over the whole length of the vacuum box and for tensioning the filtering medium.

To this end, this horizontal endless belt vacuum filter comprising an endless belt pierced, in its central part, with holes, moving above the upper opening of a longitudinal vacuum box connected to a source of vacuum and extending beneath the upper side of the conveyor belt, and an endless filtering medium passing over guide rollers and applied on the upper side of the conveyor belt, in order to receive the mass to be filtered, is characterized in that the vacuum box is mounted to pivot, as a whole, about a longitudinal axis offset laterally on one side of the conveyor belt, this vacuum box being borne by the inner ends of transverse bars which are articulated on horizontally aligned bearings materializing the pivot axis and which bear, at their outer ends, a manifold connected on the one hand to the vacuum box, via at least one connecting pipe, and on the other hand to the source of vacuum, by at least one dismountable coupling member.

According to a further feature of the invention, the device for controlling the tension of the filtering medium comprises a lower mobile weighty roller exerting a force on the filtering medium, this lower mobile weighty roller being borne by a chassis mounted to slide vertically on slides of the frame of the filter, chains or belts hooked on the mobile chassis and passing over upper guide pulleys borne by the frame and also hooked on a vertically mobile counterweight, this counterweight being constituted by a box provided, in its upper part, with a filling orifice and presenting, on one of its vertical faces, a plurality of orifices provided at different levels and each being adapted to be provided with an emptying valve.

BRIEF DESCRIPTION OF THE DRAWINGS

The invention will be more readily understood on reading the following description with reference to the accompanying drawings, in which:

FIG. 1 is a perspective view of an horizontal endless belt filter provided with a vacuum box according to the invention.

FIG. 2 is a perspective view of a variant embodiment.

FIG. 3 is a perspective view and transversal section of a vacuum box.

FIG. 4 is a perspective view of the device for controlling the tension of the filtering medium.

DESCRIPTION OF THE PREFERRED EMBODIMENTS

Referring now to the drawings, the horizontal endless belt filter which is shown schematically and partially in FIG. 1 comprises an endless conveyor belt 1, made of rubber, which may be provided, along its two edges, with longitudinal and lateral beads (not shown) giving it a cross section in the form of a trough. This belt 1 presents, in its outer surface, transverse grooves 2 which communicate with central orifices 3 aligned in the median plane of the conveyor belt 1. On this conveyor belt 1 is applied an end-less filtering medium as shown in FIG. 4 on which is deposited the mass to be filtered and which is driven longitudinally by the conveyor belt 1. This belt 1 is animated by a continuous movement and it passes over two drums 4 and 5 of horizontal and transverse axes.

The filter also comprises a longitudinal vacuum box 6 whose cross section is substantially U-shaped, with a narrowed upper opening 7, extending longitudinally beneath the central holes 3 of the belt 1. This vacuum box 6 is connected, by transverse connecting pipes 8, to a lateral and longitudinal manifold 9 itself connected, via a connecting sleeve 11, to a separator member 12 connected to a source of vacuum 13.

According to the invention, the whole of the vacuum box 6 is mounted to pivot about a longitudinal axis x—x' offset laterally on that side of the belt 1 where the manifold 9 is located, and lying beneath the plane of the lower side of this belt 1. To this end, the vacuum box 6 is borne, at least, at its two ends, by the inner ends of transverse bars 14 which are articulated on longitudinally aligned bearings 15 materializing the pivot axis x—x', and which bear, at their outer ends, the manifold 9. The assembly formed by the vacuum box 6, the manifold 9 and or each connecting pipe 8 between the vacuum box 6 and the manifold 9, is thus mounted to pivot, as a whole, about the longitudinal axis x—x'.

The provision of a plurality of connecting pipes 8 between the vacuum box 6 and the manifold 9, these pipes being spaced apart from one another in the longitudinal direction, makes it possible better to distribute the suction over the whole length of the vacuum box.

From the foregoing description, it is seen that the cleaning, positioning and/or displacement of intermediate partitions and maintenance of the vacuum box 6 are considerably facilitated. In fact, after having disconnected the sleeve 11 which connects the manifold 9 to the separator member 12, it is possible to pivot the assembly formed by the vacuum box 6 and the manifold 9 about the longitudinal axis x—x'. A movement of lift of the manifold 9 correlatively provokes a lowering of the vacuum box 6, and vice versa.

The manifold 9 may advantageously comprise one or more chambers 16 which may be filled more or less with a ballast, such as water for example, in order to ensure balance of the assembly pivoting about axis x—x'. The whole of the manifold 9 may also be used as chamber adapted to contain a certain quantity of ballast such as water for example.

In the embodiment illustrated in FIG. 1, the vacuum box 6 does not comprise inner compartments for separating the filtrates.

On the contrary, in the embodiment illustrated in FIG. 2, the vacuum box 6 is separated longitudinally into several independent compartments, and this further to the provision of intermediate transverse partitions 17 within the vacuum box 6. In this case, the manifold 9 is also separated into a number of independent compartments equal to that of the vacuum box 6, and this due to the provision of intermediate transverse partitions 18. Each of the individual compartments of the manifold 9 is connected, by at least one pipe 8, to the corresponding compartment of the vacuum box 6 and also, by a coupling sleeve 4a, 4b associated therewith, to an independent separator member 5a, 5b, ... etc, all the separator members 5a, 5b being connected in turn to the source of vacuum 13.

Referring now to FIG. 3, an advantageous embodiment of the vacuum box 6 will now be described. This vacuum box 6 comprises a removable horizontal lower cover 19 and two lateral walls constituted by two sections 21, 22 of identical cross-section, disposed symmetrically with respect to the longitudinal plane of symmetry P of the vacuum box 6. As the two sections 21, 22 are identical, only the shape of one of them will be described in detail, namely of section 21. Section 21 comprises a vertical web 21a extended, at its lower end, by an outwardly projecting U-shaped gutter which is defined by a horizontal flange 21b and an upwardly extending vertical flange 21c. This U-shaped gutter 21b, 21c is housed in a notch 23 of rectangular shape provided in the upper edge of the cover 19 which extends longitudinally. This cover 19 to which the pipes 8 are connected, is maintained attached to the lower gutters of the two sections 21, 22 by means of rapid-fastening devices 24 distributed longitudinally. Each fastening device 24 is for example fixed to the outer vertical flange such as 21c and it is connected to a hook 25 fast with the vertical edge of the cover 19.

The vertical web 21a of the section 21 is connected, at its upper end, to a flange 21d, of small width, inclined inwardly, which is in turn extended by an upper horizontal web 21e terminating in a vertical flange 21f bent downwardly. The two vertical flanges 21f, 22f of the two sections 21, 22 define therebetween the upper opening 7 of the vacuum box 6, which opening is located beneath the central holes 3 of the conveyor belt 1. The vacuum box 6 is substantially rectangular in cross-section, which shape gives the maximum useful action for the passage of air inside. In addition, it is particularly simple to manufacture since it is made from two idential sections 21, 22 bent cold. It is also seen that the cover 19 of the vacuum box 6 is easily dismountable from underneath, which enables the vacuum box to be cleaned and intermediate partitions to be positioned and/or displaced very easily, without having to dismantle the vaccum box completely or pivot it. In addition, this vacuum box is very rigid and rectilinear, this rigidity being obtained by transverse ties (not shown) connecting the two sections 21 and 22 at appropriate intervals.

On the upper horizontal flanges 21e, 22e of sections 21, 22 there are mounted longitudinal slide strips 26 which each presents, in their upper face, a groove 27 of rectangular cross-section and in which moves an endless belt 28. The endless conveyor belt 1 abuts on the two parallel belts 28 which are driven by friction. In operation, by reason of the depression prevailing inside the vacuum box 6, the two slide strips 26 tend to be driven towards the longitudinal plane of symmetry P, i.e. towards the central opening 7. To enable them to resist this tendancy, there is provided, on each of the inclined flanges 21d, 22d, an angle 29 welded by one of its flanges 29a on flange 21d, 22d and of which the other flange 29b, which is thus inclined upwardly and outwardly, is engaged in a longitudinal groove 31 of the same inclination made in the lower face of each slide strip 26. Consequently, each of the strips 26 is retained firmly by the corresponding angle 29 and it cannot slide towards the central opening 7. The fixation of the slide strips 28 on the upper horizontal flanges 21e, 22e is completed by vertical bolts 32 whose nuts mays be welded inside the vacuum box, these bolts preventing the slide strips 26 from sliding forwardly under the action of the friction of belts 28 or of the conveyor belt when belts 28 are not used.

Lubrication of the friction surface between each slide belt 28 and the bottom of the corresponding groove 27 or between the conveyor belt 1 and the upper face of the slide strip 26, is ensured by the provision, in each strip 26, of vertical holes 33 opening in the bottom of the groove 27, when a slide belt 28 is used, and communicating with horizontal, transverse holes 34 pierced in each strip 26, and whose outer orifices are connected to pipes 35 themselves connected to a source of water under pressure. A film of water may thus be permanently maintained which ensures lubrication between each slide belt 28 and the bottom of the groove 27 or between the conveyor belt 1 and the slide strip 26. The upper slide surface may present machinings which enable the film of water to be distributed.

Each slide belt 28 advantageously presents a structure such that a good coefficient of slide, both lateral and frontal, is obtained. To this end, each belt 28 is advantageously constituted by a laminated structure formed by a succession of layers constituted alternately by a fabric, for example made of polyester or cotton fibers, and by an elastomer.

FIG. 4 illustrates the manner in which the tension of the filtering medium 30 may be controlled in a particularly simple manner. This figure shows that the filtering medium 30 passes beneath a weighty roller 36 of transverse axis then rises vertically and is returned horizontally by another fixed roller 37. The lower mobile weighty roller 36 is borne by a chassis 39 mounted to slide vertically on slides of the frame 38 of the filter. To this frame are hooked chains or belts 41 passing over upper guide pulleys 42 borne by the frame 38 and also hooked to a counterweight 43 which is vertically mobile. This counterweight which is guided by columns 44, is constituted by a parallelepipedic box provided, in its upper part, with a filling orifice 45. This box also presents, on one of its vertical faces, a certain number of orifices 46 provided at different levels and each adapted to be provided with an emptying valve 47.

It is thus possible, by introducing into the boxshaped counterweight 43 a variable quantity of water, to vary the effort exerted upwardly on the chassis 39 bearing the weighty roller 36 and consequently to compensate more or less the weight of this roller, this enabling the tension of the filtering medium 30 to be adjusted.

When it is desired to slacken this medium, with a view to changing it, for example, it suffices to fill the box 43 with water via the upper orifice 45, so that this box 43, which has become heavier than the weigthy assembly constituted by the lower roller 36 and the chassis 39, causes this assembly to rise and consequently slackens the filtering medium 30.

Once the filtering medium has been changed, the valve 47 corresponding to the final level of water desired in the box 43 is opened, in order to evacuate a certain quantity of water and to reduce the weight of the box 43. Consequently, the weighty assembly 36, 39 descends again, causing the box 43 to rise, and, at equilibrium, it creates on the medium 30 a tension which depends on the level of water remaining in the counterweight 43.

What I claim is:

1. A horizontal endless belt vacuum filter comprising:
   (a) an endless conveyor belt having means defining at least one opening for filtering a mass;
   (b) an assembly comprising a plurality of transverse bars and means for applying a vacuum connected to the plurality of transverse bars;
   (c) an endless filtering medium passing over guide rollers for receiving a mass to be filtered;
   (d) the plurality of transverse bars being pivotally mounted about a longitudinal pivot axis;
   (f) the assembly mounted to pivot, as a whole, about the longitudinal pivot axis to allow for access to the means for applying a vacuum.

2. A horizontal endless vacuum belt filter according to claim 1, the assembly further comprising a manifold mounted on one end of the plurality of transverse bars, the manifold being connected on one side via at least one connecting pipe to the means for applying a vacuum and the manifold being connected on another side to at least one dismountable coupling member, the manifold comprising at least one chamber filled with a ballast for ensuring balance of the assembly as it pivots about the longitudinal pivot axis.

3. The horizontal endless vacuum belt filter according to claim 2, the means for applying a vacuum comprising a vacuum box comprising means defining an upper opening extending along substantially the entire length of the vacuum box, a removable horizontal lower cover, and two sections of identical cross-section, disposed symmetrically with respect to the longitudinal plane of symmetry of the vacuum box; each of the two sections comprising a vertical web extended, at its lower end, by an outwardly projecting Ushaped gutter which is defined by a horizontal flange and an upwardly extending vertical flange.

4. A horizontal endless belt vacuum filter according to claim 3 further comprising means for controlling the tension of the filtering medium comprising a lower mobile weighted roller for exerting a force on the filtering medium, the lower mobile weighted roller being carried by a mobile chassis mounted to slide vertically on a frame of the vacuum filter, means for pulling a vertically mobile counterweight hooked on the chassis and passing over upper guide pulleys carried by the frame; the counterweight comprising a box provided, in its upper part, with means defining a filling orifice and presenting, on one of its vertical faces, means defining a plurality of orifices provided at different levels and each having an emptying valve.

5. A horizontal endless belt vacuum filter according to claim 4 the manifold being connected to the vacuum box by a plurality of connecting pipes spaced apart from one another in the longitudinal direction for better distributing suction over substantially the entire length of the vacuum box.

6. A horizontal endless belt vacuum filter according to claim 5 wherein
   (a) the vacuum box comprises a first plurality of independent compartments formed by a first plurality of independent transverse partitions;
   (b) the manifold comprises a second plurality of independent compartments formed by a second plurality of intermediate transverse partitions, the number of the second plurality of independent compartments being equal to that of the first plurality of compartments in the vacuum box; and
   (c) each of the second plurality of independent compartments being connected to a corresponding compartment in the first plurality of independent compartments by at least one pipe and each of the second plurality of independent compartments being connected to an independent separator member by a coupling sleeve, each of the independent separator members being adapted to be connected to the source of vacuum.

7. A horizontal endless belt vacuum filter comprising:

(a) an endless conveyor belt having at least one opening for filtering a mass;
(b) an assembly comprising a plurality of transverse bars, a manifold and means for applying a vacuum to the belt;
(c) an endless filtering medium passing over guide rollers for receiving a mass to be filtered;
(d) the plurality of transverse bars being pivotally mounted about a longitudinal pivot axis;
(e) the manifold being mounted on one end of the plurality of transverse bars, the manifold being connected on one side via at least one connecting pipe to the means for applying a vacuum, and the manifold being connected on another side to at least one dismountable coupling member;
(f) the assembly mounted to pivot, as a whole, about the longitudinal pivot axis to allow for access to the means for applying a vacuum; and
(g) the manifold comprising at least one chamber filled with a ballast for ensuring balance of the assembly pivoting about the longitudinal pivot axis.

8. The horizontal endless vacuum belt filter according to claim 7 the means for applying a vacuum comprising a vacuum box comprising means defining an upper opening extending along substantially the entire length of the vacuum box, a removable horizontal lower cover, and two sections of identical cross-section, disposed symmetrically with respect to the longitudinal plane of symmetry of the vacuum box; each of the two sections comprising a vertical web extended, at its lower end, by an outwardly projecting Ushaped gutter which is defined by a horizontal flange and an upwardly extending vertical flange.

9. A horizontal endless belt vacuum filter according to claim 8, further comprising means for controlling the tension of the filtering medium comprising a lower mobile weighted roller for exerting a force on the filtering medium, the lower mobile weighted roller being carried by a mobile chassis mounted to slide vertically on a frame of the vacuum filter, means for pulling a vertically mobile counterweight hooked on the chassis and passing over upper guide pulleys carried by the frame; the counterweight comprising a box provided, in its upper part, with means defining a filling orifice and presenting, on one of its vertical faces, means defining a plurality of orifices provided at different levels and each having an emptying valve.

10. A horizontal endless belt vacuum filter according to claim 9 the manifold being connected to the vacuum box by a plurality of connecting pipes spaced apart from one another in the longitudinal direction for better distributing suction over substantially the entire length of the vacuum box.

11. A horizontal endless belt vacuum filter according to claim 10 wherein
(a) the vacuum box comprises a first plurality of independent compartments formed by a first plurality of independent transverse partitions;
(b) the manifold comprises a second plurality of independent compartments formed by a second plurality of intermediate transverse partitions, the number of the second plurality of independent compartments being equal to that of the first plurality of compartments in the vacuum box; and
(c) each of the second plurality of independent compartments being connected to a corresponding compartment in the first plurality of independent compartments by at least one pipe and each of the second plurality of independent compartments being connected to an independent separator member by a coupling sleeve, each of the independent separator members being adapted to be connected to the source of vacuum.

12. A horizontal endless belt vacuum filter comprising:
(a) an endless conveyor belt having means defining a plurality of holes in a center part of the conveyor belt;
(b) an assembly comprising a longitudinal vacuum box adapted to be connected to a source of vacuum and having means defining an upper opening extending beneath an upper side of the conveyor belt such that the plurality of holes move above the upper opening of the vacuum box;
(c) an endless filtering medium passing over guide rollers and applied on the upper side of the conveyor belt for receiving a mass to be filtered;
(d) the assembly further comprising a plurality of transverse bars, each having an inner end, the vacuum box being carried by the inner ends and each of the plurality of transverse bars being articulated on a horizontally aligned bearing for forming a longitudinal pivot axis;
(e) the assembly further comprising a manifold mounted on outer ends of the plurality of transverse bars, the manifold connected on one side via at least one connecting pipe to the vacuum box, and the manifold connected on another side to at least one dismountable coupling member adapted to be connected to a source of vacuum;
(f) the assembly being mounted to pivot, as a whole, about the longitudinal pivot axis; and
(g) the manifold comprising at least one chamber which may be filled with a varying amount of ballast for ensuring balance of the assembly pivoting about the longitudinal pivot axis, the ballast comprising water.

13. A horizontal endless belt vacuum filter according to claim 12, wherein
(a) the vacuum box comprises a first plurality of independent compartments formed by a first plurality of intermediate transverse partitions;
(b) the manifold comprises a second plurality of independent compartments formed by a second plurality of intermediate transverse partitions, the number of the second plurality of independent compartments being equal to that of the first plurality of compartments in the vacuum box; and
(c) each of the second plurality of independent compartments being connected to a corresponding compartment in the first plurality of independent compartments by at least one pipe and each of the second plurality of independent compartments being connected to an independent separator member by a coupling sleeve, each of the independent separator members being adapted to be connected to the source of vacuum.

14. A horizontal endless belt vacuum filter according to claim 13, wherein each section comprises a vertical web extended, at its lower end, by an outwardly projecting U-shaped gutter which is defined by a horizontal flange and an upwardly extending vertical flange, the U-shaped gutter is housed in a notch of rectangular shape provided in the upper edge of the cover which extends longitudinally, the cover to which the pipes are connected being attached to the lower gutters of the two sections by means of rapid-fastening devices distributed longitudinally; and the vertical web of each section being connected, at its upper end, to a flange of small width, inclined inwardly, which is in turn extended by an upper horizontal web terminating in a vertical flange bent downwardly, the two vertical flanges of the two sections defining therebetween the upper opening of the vacuum box.

15. A horizontal endless belt vacuum filter according to claim 14, wherein on the upper horizontal flanges of sections there are mounted longitudinal slide strips which each present, in their upper face, a groove of rectangular cross-section and in which moves an endless belt, an angle is welded, by one of its flanges, on each of the inclined flanges of each section and of which the other flange, which is thus inclined upwardly and outwardly, is engaged in a longitudinal groove of the same inclination made in the lower face of each slide strip.

16. A horizontal endless belt vacuum filter according to claim 15, wherein each slide strip is pierced with means defining vertical holes opening in the bottom of the groove when a slide belt is used, the vertical holes communicating with means defining horizontal, transverse holes pierced in each slide strip, the outer orifices of the horizontal holes being connected to pipes which are adapted to be connected to a source of water under pressure so that a film of water may thus be permanently maintained which ensures lubrication between each slide belt and the bottom of the groove or between the conveyer belt and the slide strip.

17. A horizontal endless belt vacuum filter according to claim 15, wherein each slide belt is constituted by a laminated structure formed by a succession of layers constituted alternately by a fabric, for example made of polyester or cotton fibers, and by an elastomer.

18. A horizontal endless belt vacuum filter according to claim 12, the at least one chamber consisting of only one chamber containing a varying amount of ballast, the manifold adapted to operate as the only chamber.

19. A horizontal endless belt vacuum filter according to claim 12, the manifold being connected to the vacuum box by a plurality of connecting pipes spaced apart from one another in the longitudinal direction for better distributing suction over substantially the entire length of the vacuum box.

20. A horizontal endless belt vacuum filter according to claim 12 the at least one dismountable coupling member being adapted to be connected to the source of vacuum and the longitudinal pivot axis being offset laterally on one side of the conveyor belt.

21. A horizontal endless belt vacuum filter according to claim 12, further comprising means for controlling the tension of the filtering medium comprising a lower mobile weighted roller exerting a force on the filtering medium, the lower mobile weighted roller being carried by a mobile chassis mounted to slide vertically on slides of a frame of the vacuum filter, chains or belts being hooked on the mobile chassis and passing over upper guide pulleys being carried by the frame and also being hooked on a vertically mobile counterweight, the counterweight comprising a box provided, in its upper part, with means defining a filling orifice and presenting, on one of its vertical faces, means defining a plurality of orifices provided at different levels and each provided with an emptying valve.

22. A horizontal endless belt vacuum filter according to claim 12, wherein the vacuum box comprises a removable horizontal lower cover and two lateral walls constituted by two sections of identical cross-section, disposed symmetrically with respect to the longitudinal plane of symmetry of the vacuum box.

23. A horizontal endless belt vacuum filter comprising:
(a) an endless conveyor belt having means defining a plurality of holes in a center part of the conveyor belt;
(b) an assembly comprising a longitudinal vacuum box, a plurality of transverse bars and a manifold;
(c) the longitudinal vacuum box having means defining an upper opening extending beneath an upper side of the conveyor belt such that the plurality of holes move above the upper opening of the vacuum box;
(d) an endless filtering medium passing over guide rollers and applied on the upper side of the conveyor belt for receiving a mass to be filtered;
(e) the plurality of transverse bars, each having an inner end, the vacuum box being carried by the inner ends, and each of the plurality of transverse bars are articulated on a horizontally aligned bearing for forming a longitudinal pivot axis;
(e) the manifold mounted on outer ends of the plurality of transverse bars, the manifold connected on one side via at least one connecting pipe to the vacuum box, and the manifold connected on another side to at least one dismountable coupling member;
(f) the assembly being mounted to pivot, as a whole, about the longitudinal pivot axis.

24. A horizontal endless belt vacuum filter according to claim 23, the manifold comprising at least one compartment, the at least one compartment being operable to provide ballast for the assembly as it is pivoted about the longitudinal pivot axis.

25. A horizontal endless belt vacuum filter according to claim 24, the at least one dismountable coupling member being adapted to be connected to a source of vacuum for operably connecting the vacuum box to the source of vacuum and the longitudinal pivot axis being offset laterally on one side of the conveyor belt.

* * * * *